United States Patent [19]

Min

[11] Patent Number: 5,555,141
[45] Date of Patent: Sep. 10, 1996

[54] APPARATUS FOR ELECTRICALLY DETECTING STARTING/ENDING PORTIONS OF A TAPE

[75] Inventor: Young-hoon Min, Anyang, Rep. of Korea

[73] Assignee: Samsung Electronics Co., Ltd., Kyungki-do, Rep. of Korea

[21] Appl. No.: 331,936

[22] Filed: Oct. 31, 1994

[30] Foreign Application Priority Data

Oct. 29, 1993 [KR] Rep. of Korea .................. 93-22743

[51] Int. Cl.⁶ .................................................. G11B 23/32
[52] U.S. Cl. ...................................... 360/74.7; 360/72.3
[58] Field of Search ......................... 360/74.7, 72.3, 360/74.5

[56] References Cited

U.S. PATENT DOCUMENTS

| | | | |
|---|---|---|---|
| 2,694,110 | 11/1954 | Roberts | 360/74.7 X |
| 2,952,746 | 9/1960 | Sampson | 360/74.7 X |
| 3,039,319 | 6/1962 | Lekas | 360/74.7 X |
| 3,666,203 | 5/1972 | Sato et al. | 360/74.7 X |
| 3,708,632 | 1/1973 | Parilla | 360/74.7 X |

*Primary Examiner*—Aristotelis Psitos
*Assistant Examiner*—James L. Habermehl
*Attorney, Agent, or Firm*—Sughrue, Mion, Zinn, Macpeak & Seas

[57] ABSTRACT

An apparatus, for detecting the starting or ending portion of a tape, has a detector for detecting the starting portion or the ending portion of the tape wound on a take-up reel and a supply reel of a cassette. The apparatus includes a first guide installed on at least one side adjacent to the tape inlet/outlet opening of the cassette to be loaded, and which is in contact with a recording surface of the tape. A second guide is fixed so as to be electrically insulated from the first guide, and is in contact with a recording surface of the tape. A voltage applying circuit is provided for applying a predetermined voltage level across the first and second guides. The starting portion or the ending portion of the tape is detected depending on the presence or absence of electrical current between the first and second guides.

8 Claims, 2 Drawing Sheets

APPARATUS FOR ELECTRICALLY DETECTING STARTING/ENDING PORTIONS OF A TAPE

BACKGROUND OF THE INVENTION

1. Field of the Invention

The present invention relates to a magnetic recording and reproducing system and, more particularly, to an apparatus for detecting a tape terminus in a magnetic recording and reproducing system, by detecting a starting portion or an ending portion of a tape during recording and reproduction.

2. Description of the Related Art

In general, a magnetic recording and reproducing system for a cassette tape is provided with multiple guiding members and guide poles for guiding the tape supplied from a supply reel for the cassette tape, a head for recording and reproducing information, and a pinch roller and capstan axis for transferring a tape at a constant speed, along a travelling track of the tape. In order to prevent excessive tension from being applied to the tape during recording and reproduction, to protect the driving device thereof and to control the operation of the reproducing apparatus, there is also provided a detection means for detecting a starting portion or an ending portion of a tape. Here, the starting portion and the ending portion of the tape are generally made of a transparent material which is optically transmissible.

An example of such a detection means is disclosed in FIG. 1. A light emitting device 21 is installed between a supply reel 11 and a take-up reel 12, light receiving devices 22 are installed on opposite sides of the light emitting device 21, and a travelling cassette tape is positioned between the light emitting device 21 and each of the light receiving devices 22.

In the conventional detecting means having the aforementioned configuration, when the light emitting device 21 and the light receiving devices 22 operate, the cassette tape 100 is wound on the take-up reel 12 via the guiding member and the head during recording and reproducing. In the course thereof, if the optically transmissible starting portion or ending portion of the tape 100 positioned at either terminus of the tape 100 starts to unwind, the light radiated from light emitting device 21 passes through the transparent portion (starting or ending terminus), so as to be detected by the corresponding light receiving device 22, thereby detecting the starting portion or the ending portion of the tape 100. Once the light is detected by either of the light receiving devices 22 as described above, the operation of stopping and/or rewinding the tape 100 is performed by a microprocessor provided in the magnetic recording and reproducing system.

However, since the light emitting device 21 and the light receiving devices 22 should be fixed on a deck by means of separate members, for the conventional detection means as above, the configuration thereof becomes complicated. Also, if the relative positioning of the light emitting device 21 and the light receiving devices 22 becomes skewed, the operations thereof cannot be performed properly.

A conventional detecting means for solving such a problem is disclosed in Japanese Laid-open Patent Publication sho 63-4450. Referring to FIGS. 2 and 3, the detecting means includes a light receiving/emitting device 30 having a light emitting portion 31 which is light-emissive bidirectionally, and a light receiving portion 32 which is light-receivable bidirectionally. Light receiving/emitting device 30 is internally installed between the tape. The detecting means further includes two optically reflecting members 40 installed opposingly on either side thereof.

According to the conventional tape detecting means having the above-described configuration, the light emitted from light emitting portion 31 of light receiving/emitting device 30 is reflected onto reflecting members 40 installed outside the tape and is detected in light receiving portion 32 of the light receiving/emitting device 30, thereby detecting the starting or ending portion of the tape.

Such conventional detecting means reduce the manufacturing cost by installing only a single light receiving/emitting device 30 having a light emitting portion 31 and a light receiving portion 32. However, since the detection is performed such that the light emitted from light emitting portion 31 is reflected onto reflecting members 40 and then is detected in receiving portion 32, it is important to prevent any obstructions along the light path between light receiving/emitting device 30 and reflecting members 40. Therefore, it is quite difficult to install such a detecting means sufficing the aforementioned requirement.

SUMMARY OF THE INVENTION

To solve the above problems, it is an object of the present invention to provide an apparatus, for detecting the starting or ending portion of a cassette tape, which can easily detect the starting portion or the ending portion of a tape and can thus improve operational reliability.

To accomplish the above object according to one aspect of the present invention, an apparatus is provided for detecting the starting portion or the ending portion of a tape wound on a take-up reel and a supply reel of a cassette. The apparatus comprises: first guiding means installed on at least one side adjacent to the tape inlet/outlet opening of the cassette to be loaded, and being in contact with a recording surface of the tape; second guiding means fixed so as to be electrically insulated from the first guiding means, and being in contact with the recording surface of the tape; and voltage applying means for applying a predetermined voltage level across the first guiding means and the second guiding means, wherein the starting portion or the ending portion of the tape is detected depending on the presence or absence of an electrical current between the first guiding means and the second guiding means.

According to another aspect of the present invention, an apparatus, for detecting the starting portion or the ending portion of a tape, has a detection means for detecting the starting portion or the ending portion of the tape wound on a take-up reel and a supply reel of a cassette. The detecting means comprises: first guiding means fixed on a chassis on at least one side adjacent to the tape inlet/outlet opening of the cassette to be loaded onto a deck, and being in contact with the tape, for guiding the tape; second guiding means fixed so as to be electrically insulated from the main chassis, and being in contact with the tape, for guiding the tape; and voltage applying means for applying a predetermined voltage level across the first guiding means and the second guiding means, and wherein the starting portion or the ending portion of the tape is detected depending on the presence or absence of the electrical current between the first guiding means and the second guiding means.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE PREFERRED EMBODIMENT

Figure 1:
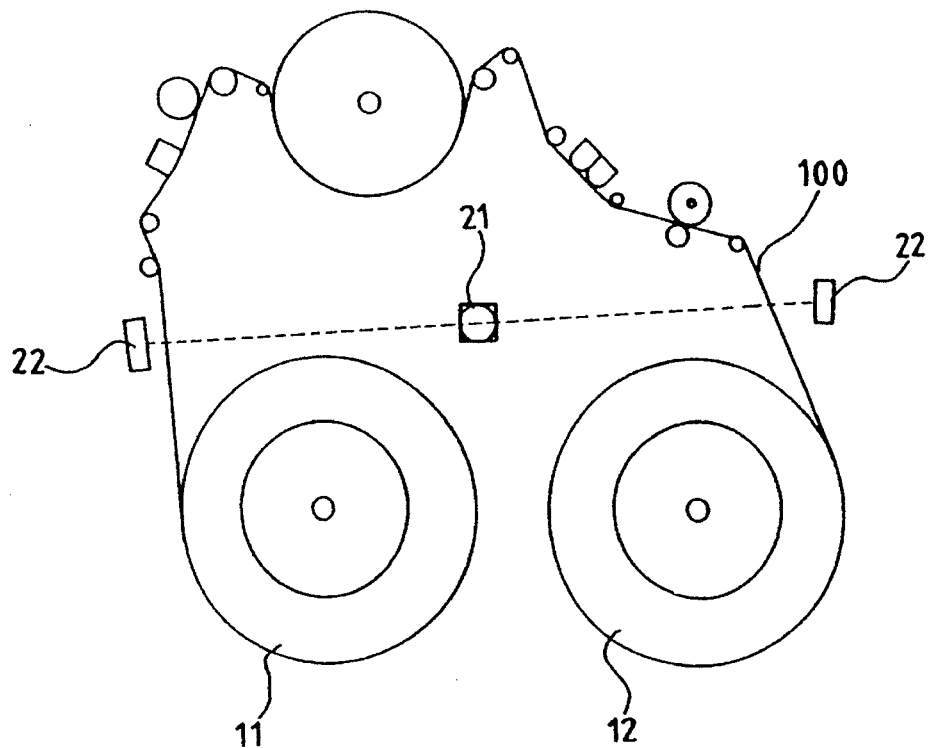
FIG. 1 is a schematic diagram of detecting means for showing the state of the tape driven by a conventional magnetic recording and reproducing system.
Figure 2:
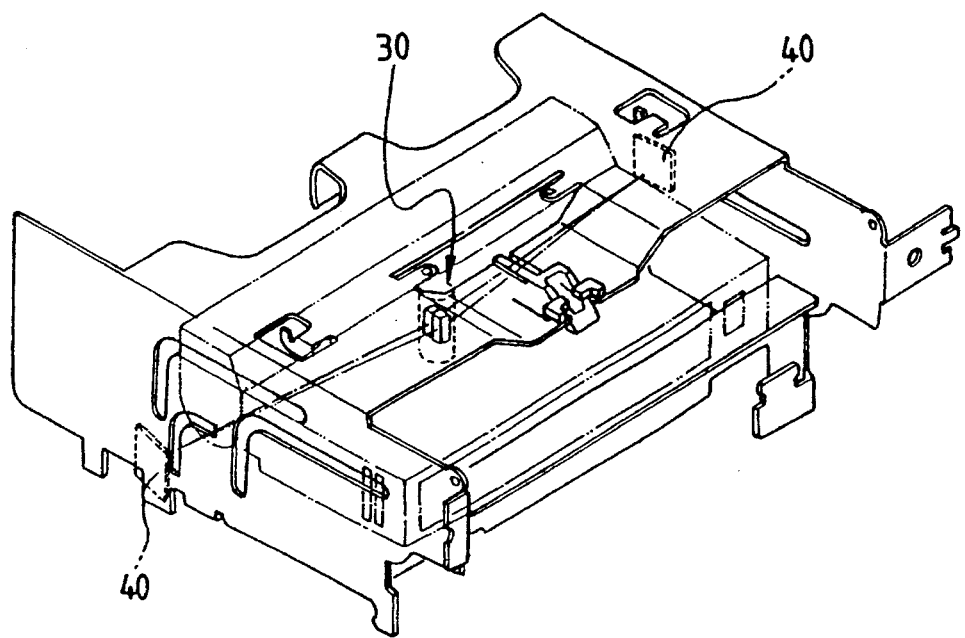
FIG. 2 is a perspective view showing an apparatus for detecting a tape terminus for another conventional magnetic recording and reproducing system.
Figure 3:
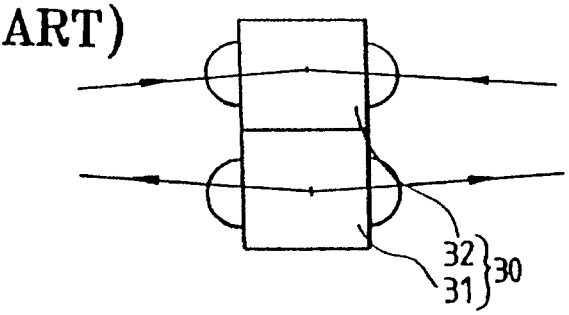
FIG. 3 is an extracted plan view of the light receiving and emitting device shown in FIG. 2.
Figure 4:
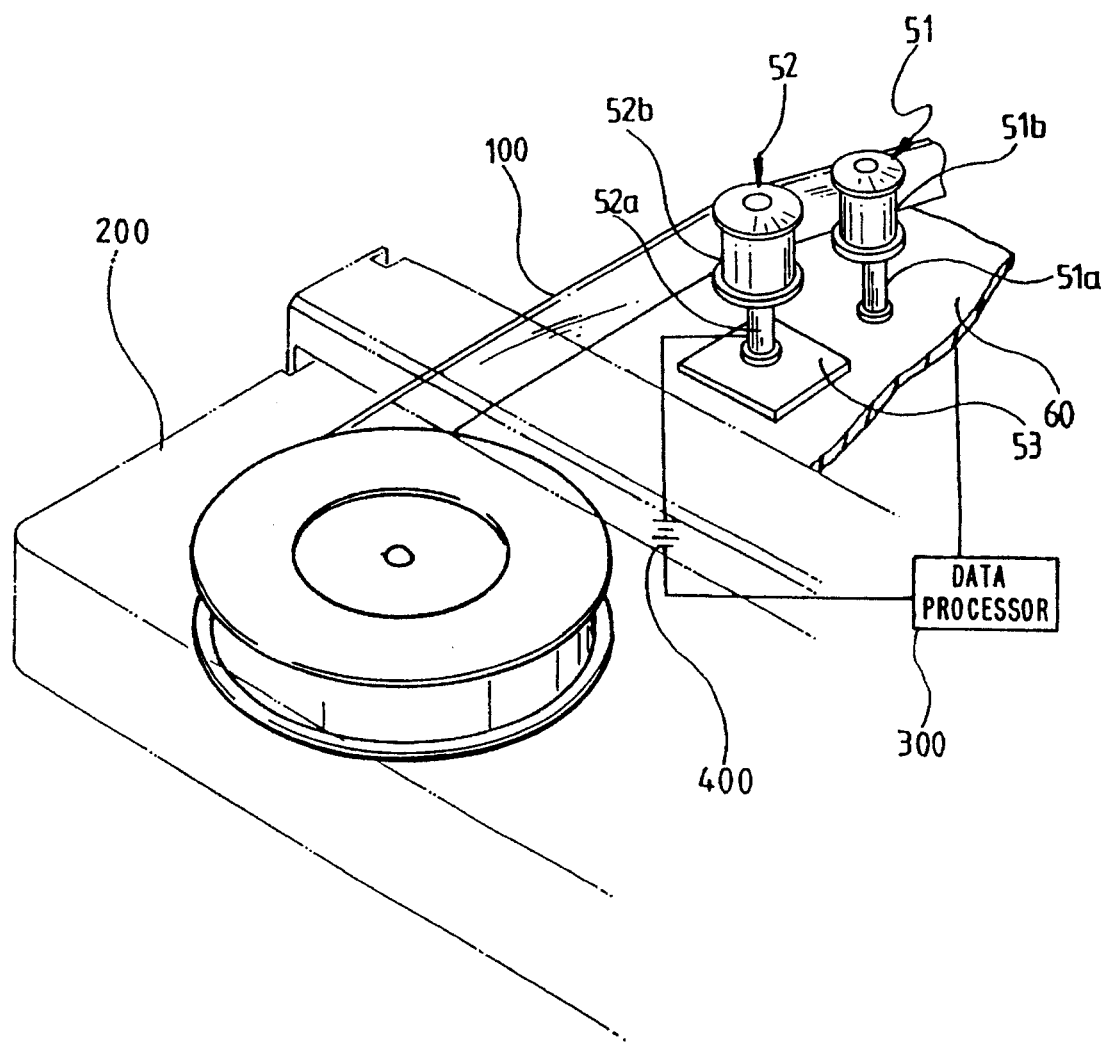
FIG. 4 is an extracted perspective view of an apparatus for detecting starting or ending portion of a tape for a magnetic recording and reproducing system according to the present invention.

The apparatus for detecting the starting portion or the ending portion of a tape for a magnetic recording and reproducing system according to the present invention utilizes the principle that the recording surface of a tape has an electrical current applied thereto, an embodiment of which is shown in FIG. 4.

Referring to FIG. 4, adjacent to the tape inlet/ outlet opening portion of the cassette that is loaded on a deck, a first guide 51, which is in contact with the recording surface of a tape 100 drawn out from a cassette 200, is provided for guiding the tape and is installed so as to be electrically connected with a chassis 60. A second guide 52, which is in contact with the recording surface of the tape 100, is provided for guiding the tape and is also fixed on the chassis 60 adjacent to the first guide 51 but in a manner so as to be electrically insulated from the chassis 60.

More specifically, the first guide 51 has a first support member 51a fixed on the chassis 60, and a first roller member 51b rotatably installed on the upper end of the first support member 51a and which is electrically conductive. The second guide 52 has a second support member 52a insulated from the chassis 60 by an insulating member 53, and a second roller member 52b rotatably installed on the upper end of the second support member 52a for guiding the tape.

A predetermined voltage level is applied to the chassis 60 and the second guide 52, which is insulated therefrom, via a voltage applying means 400 such as a battery. Therefore, a potential difference is generated between the first and second guides 51 and 52. There is further provided a data processor 300 for controlling the magnetic recording and reproducing system depending on the electrical current flow through the tape 100 between the first and second guides 51 and 52.

The operation of the apparatus for detecting the starting portion or the ending portion of a tape for a magnetic recording and reproducing system according to the present invention will now be described.

First, during the driving of the tape 100 using a magnetic recording and reproducing system, when the starting portion of the tape 100 makes contact with the first roller member 51b of the first guide 51 and with the second roller member 52b of the second guide 52, since no current is carried between the first and second guides 51 and 52 due to a non-recorded surface of tape 100, it is determined that the corresponding segment of the tape is the starting portion thereof.

During the travelling of the tape 100, since the recording surface of the tape is guided to the first and second roller members 51b and 52b so that current is carried between the first and second guides 51 and 52, it is appreciated that tape 100 is capable of recording and reproducing or is being wound. If the tape terminus is guided to the first and second roller members 51b and 52b, electrical current is not carried between the first and second guides 51 and 52. In this manner, if the current is not carried between the first and second guides 51 and 52, such a state is detected by the data processor, thereby stopping driving and/or rewinding of the tape 100.

When the non-recorded surface where the current is normally not carried makes contact with the first and second guides during the travelling of tape 100, a conductive layer may be formed on the surface of the optically transmissible starting and ending portions of the tape, to then be operated in the opposite manner to the above-described manner.

As described above, the apparatus for detecting the starting portion or the ending portion of a cassette tape for a magnetic recording and reproducing system according to the present invention can easily detect the starting portion or the ending portion of the tape depending on the presence or absence of the current between the first and second guides for guiding the tape. Therefore, the apparatus according to the present invention has a simplified configuration and can prevent the tape from being damaged due to excessive tension during a recording and reproducing operation.

It is contemplated that numerous modifications may be made to the apparatus for detecting the starting or ending portion of a tape of the present invention without departing from the spirit and scope of the invention as defined in the following claims.

What is claimed is:

1. An apparatus for detecting at least one of a starting portion and an ending portion of a tape wound on a take-up reel and a supply reel of a cassette, wherein said apparatus comprises:

first guiding means installed on at least one side adjacent to a tape opening of the cassette to be loaded, and being in contact with a recording surface of said tape;

second guiding means which is structurally independent from and laterally spaced apart from said first guiding means and which is fixed so as to be electrically insulated from said first guiding means, said second guiding means being in contact with the recording surface of said tape; and voltage applying means for applying a predetermined voltage level across said first guiding means and said second guiding means, wherein the at least one of the starting portion and the ending portion of said tape is detected depending on the presence or absence of an electrical current between said first guiding means and said second guiding means.

2. The apparatus for detecting at least one of the starting portion and the ending portion of a tape as claimed in claim 1, wherein said first guiding means includes a first support member adapted to be fixed on a chassis and a first roller member rotatably installed on said first support member and being electrically conductive.

3. The apparatus for detecting at least one of the starting portion and the ending portion of a tape as claimed in claim 1, wherein said second guiding means includes a second support member fixed so as to be electrically insulated from the chassis and a second roller member rotatably installed on said second support member.

4. The apparatus for detecting at least one of the starting portion and the ending portion of a tape as claimed in claim 1, further comprising a data processor for controlling said cassette to be driven depending on the presence or absence of the electrical current between said first and second guiding members.

5. An apparatus for detecting at least one of a starting portion and an ending portion of a tape and having a detection means for detecting at least one of the starting portion and the ending portion of the tape wound on a take-up reel and a supply reel of a cassette in a magnetic recording and reproducing system, the magnetic recording and reproducing system including a chassis and a deck, wherein said detection means comprises:

first guiding means fixed on the chassis on at least one side adjacent to a tape opening of the cassette to be loaded onto the deck, and being in contact with said tape, for guiding said tape;

second guiding means which is structurally independent from and laterally spaced apart from said first guiding means on the chassis and which is fixed so as to be electrically insulated from the chassis, said second guiding means being in contact with said tape, for guiding said tape; and voltage applying means for applying a predetermined voltage level across said first guiding means and said second guiding means, wherein the at least one of the starting portion and the ending portion of said tape is detected depending on the presence or absence of an electrical current between said first guiding means and said second guiding means.

6. The apparatus for detecting at least one of the starting portion and the ending portion of a tape as claimed in claim 5, wherein said first guiding means includes a first support member fixed on the chassis and a first roller member rotatably installed on said first support member and being electrically conductive.

7. The apparatus for detecting at least one of the starting portion and the ending portion of a tape as claimed in claim 5, wherein said second guiding means includes a second support member fixed so as to be electrically insulated from the chassis and a second roller member rotatably installed on said second support member.

8. The apparatus for detecting at least one of the starting portion and the ending portion of a tape as claimed in claim 5, further comprising a data processor for controlling said cassette to be driven depending on the presence or absence of the electrical current between said first and second guiding members.

* * * * *